Dec. 27, 1966        R. L. STEDFELD        3,293,860

FILAMENT WOUND CONTAINER HAVING REINFORCED OPENING

Filed May 20, 1964        2 Sheets-Sheet 1

INVENTOR.
Rowland L. Stedfeld
BY
Peter P. Kozak
ATTORNEY

Dec. 27, 1966   R. L. STEDFELD   3,293,860
FILAMENT WOUND CONTAINER HAVING REINFORCED OPENING
Filed May 20, 1964   2 Sheets-Sheet 2

INVENTOR.
Rowland L. Stedfeld
BY
Peter P. Kozak
ATTORNEY

United States Patent Office 3,293,860
Patented Dec. 27, 1966

3,293,860
FILAMENT WOUND CONTAINER HAVING REINFORCED OPENING
Rowland L. Stedfeld, Indianapolis, Ind., assignor to General Motors Corporation, Detroit, Mich., a corporation of Delaware
Filed May 20, 1964, Ser. No. 368,831
6 Claims. (Cl. 60—263)

This invention relates generally to vessels or containers, such as solid-propellent rocket fuel or motor cases, which are commonly used to store or transport fluids or solid materials in a state of high pressure, high temperature or under corrosive environmental conditions. More particularly, this invention relates to a method of reinforcing the blast port or nozzle area of a plastic impregnated filament wound rocket fuel case.

High pressure fluid containers, such as liquid oxygen cylinders and the like, are usually constructed in the shapt of elongated cylinders from metals, such as steel, to obtain adequate structural strength. However, in some applications, such as rocket fuel or motor cases, high pressure metal containers have certain inherent drawbacks due to the high ratio of container weight to container volume and the susceptibility of the metal to corrosion and fragmentation damage at the high temperatures and pressures encountered during fuel combustion. Naturally, the qualities of lightweight construction and high resistance to fragmentation and corrosion damage are highly desirable in rocket fuel or motor cases to prevent malfunctioning of the rocket in operation. Hence, in recent years, these design criteria have been satisfactorily met by the development of high pressure containers consisting of laminated layers of wound fiberglass filament or various types of synthetic filament, such as nylon and rayon yarn, which are bonded together by a thermosetting plastic resin.

Filament wound cases or containers are usually formed with the aid of a machine which is designed to wind a plurality of layers or laminations of the filament or yarn in a helical pattern over a generally cylindrical shaped removable mandrel having dome-shaped ends. The machine usually includes a traveling spool from which the filament is continuously fed to the mandrel which is rotated on a shaft in a timed relationship with the movement of the spool so that the helical windings or wrappings of each layer or lamination are closely spaced. Also, the filament is normally wound in such a manner that the helical windings of each successive layer or lamination are oriented at a different angle with respect to the axis of the mandrel, but the helical windings of alternate layers are oriented at approximately the same angle on the mandrel. This crisscross laminated or double loop arrangement generally improves the structural strength of the container or case. However, in some instances, it is also desirable to add circumferential hoop windings or wrappings to the cylindrical portion of the case to further improve its structural hoop strength.

The filament employed in winding the container may be impregnated, in situ, as wound on the mandrel with a suitable thermosetting plastic bonding medium, such as an epoxy resin, or the filament may be preimpregnated with the plastic bonding medium and wound over the mandrel in a wet or partially cured state. After the desired number of windings or wrappings have been applied and impregnated with the plastic bonding material, the structure so formed is subjected to a final curing step by a conventional means, such as a heat treatment, so that a strong, integral, laminated, lightweight, fluid-tight container or case results. The mandrel is then removed through one of the openings in the center of the dome-shaped ends of the container which result from the shaft being affixed to the mandrel in those positions during the winding operation, as will hereinafter be more fully explained.

When plastic impregnated filament wound containers of the above type are employed as a rocket fuel or motor case, it is usually necessary to provide openings for nozzle port tubes or other fittings, such as piping and valves, in the dome-shaped end portions of the case. This, of course, necessitates the severing of the filament strands or ribbons forming the laminated layers of windings or wrappings in those areas of the case so that the nozzle port tubes may be suitably positioned therein. However, when the laminated strands of the filament are severed, the overall structural strength of the case is considerably weakened in those areas, since the stresses developed in the severed strands are not transmitted or distributed to the other case winding. Hence, it is highly desirable to provide a method of reinforcing those areas of the case wherein the windings or wrappings of filament are severed to provide openings for various fittings, and particularly nozzle ports for filament wound rocket cases, since in the latter instance these areas are subjected to very high pressure conditions during rocket motor operation.

Therefore, it is a principal object of the present invention to provide a method of reinforcing the areas of a laminated, high pressure, filament wound container or case where the filament windings or wrappings have been severed to provide openings in the container for connecting nozzle fixtures, valves or piping and the like.

It is another object of the present invention to provide a method of reinforcing the areas of laminated filament wound cases which are subjected to high localized operational stresses to transmit and distribute the stresses so developed in those areas of the case into the normal case windings.

It is a further object of the present invention to provide a laminated filament wound rocket fuel or motor case which has high structural strength and excellent resistance to damage by fragmentation, corrosion and thermal deterioration.

These and other objects are accomplished in accordance with the present invention by providing preformed reinforcement subassemblies having the appropriate contour of the area of the laminated filament wound container or case which is to be reinforced and alternately positioning the subassemblies between successive layers of the filament windings, and particularly, in those areas of the case where the windings have been severed to provide openings therethrough. The subject reinforcement subassemblies are preferably formed from the same type of filament and plastic bonding materials used in forming the regular laminated filament wound case structure so that the subassemblies may be integrally incorporated in and bonded to the successive layers of filament windings by an appropriate curing treatment, such as a conventional heat treatment, wherein the plastic bonding medium impregnating all the filament wound parts of the case is cured to form a strong, fluid-tight, integral case or container structure. Hence, since the subject reinforcement subassemblies may be integrally incorporated in those portions of the case where the filaments are severed to provide openings for connections, such as nozzle ports, the reinforcement subassemblies transmit and distribute the stresses developed in the severed strands to the other case windings, thereby greatly improving the overall structural strength of the case.

Other objects, features and advantages of the present invention will be apparent from the following detailed description of certain embodiments thereof taken in conjunction with the accompanying drawings, in which.

Figures 1, 2, 3:
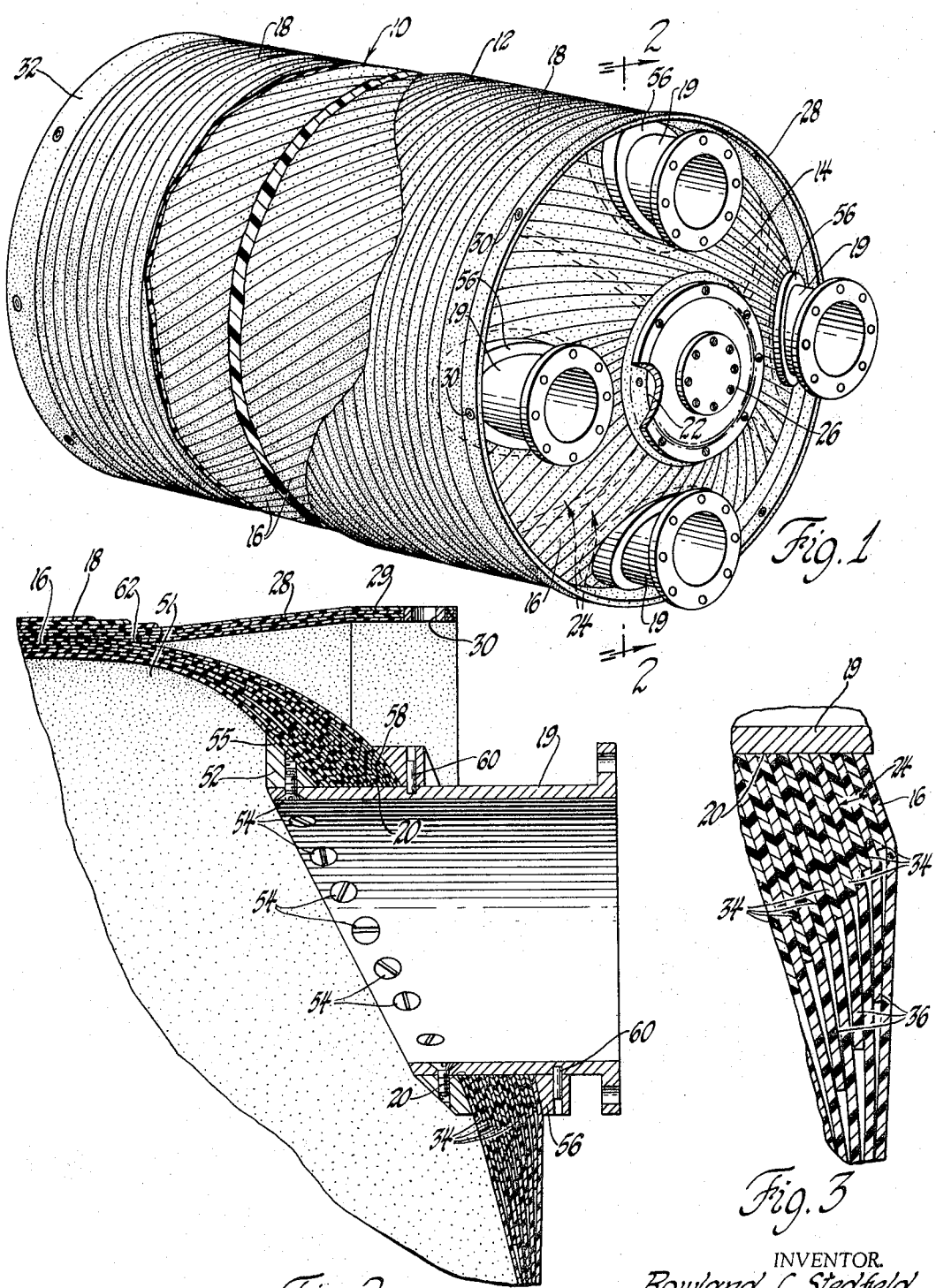
FIGURE 1 is a perspective view, with parts broken away and in section, of a generally cylindrical, laminated rocket fuel or motor case which is reinforced in accordance with the present invention in the dome-shaped end portion of the case around four nozzle port openings provided therein.
FIGURE 2 is a partial cross-sectional view, taken along the line 2—2 of FIGURE 1, which illustrates the subject reinforced nozzle port area of the dome-shaped end portion of the rocket fuel case illustrated in FIGURE 1.
FIGURE 3 is an enlarged partial cross-sectional view of the reinforcement subassembly embodying the present invention and case winding structure illustrated in FIGURE 2.

Referring to FIGURE 1 of the drawings, a typical laminated filament wound rocket motor or fuel case 10 embodying the present invention is illustrated. The case 10 consists of a cylindrical body portion 12 and dome-shaped end portions 14, such as the aft dome portion, which are formed of a plurality of layers or laminations of plastic impregnated helical filament windings 16 and some circumferential hoop windings, such as at 18, utilizing any suitable winding machine of the type described above. The filament used in forming the case may be made of any suitable material, such as fiberglass ribbon, nylon yarn or rayon yarn, although fiberglass is preferred. Also, the shape and thickness of the filament employed may vary considerably depending on the structural characteristics desired. Any suitable thermosetting plastic bonding medium, such as polyester and epoxy resin systems, having the requisite bonding and structural properties may be employed to impregnate the filament windings or wrappings forming the case, although epoxy resins are generally preferred. For instance, the epoxy resin compositions and methods of curing same which are disclosed in United States Patent No. 3,052,650 Wear et al. may be satisfactorily employed in accordance with the present invention to impregnate the filament windings and bond the resulting container structure together, as will hereinafter be more fully explained.

The helical windings may lie at any suitable angle with respect to the axis of the case, depending on the axial and hoop strength desired. Also, the case is preferably wound by a suitable machine over a mandrel (not shown in the drawings) having the desired shape of the resulting case or container in a manner such that the helical windings or wrappings of each successive layer or lamination are oriented at a different angle with respect to the axis of the case, but the helical windings or wrappings of alternate layers are oriented at appromimately the same angle with respect to the axis of the case. This type of crisscross winding pattern of the filament layers is commonly referred to as a double loop pattern and has a relatively good structural strength.

As shown in FIGURE 1 of the drawings, the aft dome portion 14 of the case 10 is provided with four generally cylindrical nozzle port tubes 19 positioned in openings 20, as shown in FIGURE 2 of the drawings, which extend through the helical windings in that portion of the case. The nozzle port tubes 19 are equally circumferentially separated and radially spaced from the centrally located opening 22 in that portion of the case. As will hereinafter be more fully explained, the aft dome portion 14 of the case includes a plurality of integrally bonded reinforcement subassemblies indicated by the dotted lines 24 which are positioned between successive layers of the normal helical case windings. The reinforcement subassemblies are designed to transmit and distribute the operational stresses developed in the severed strands of filament in the areas surrounding the nozzle port openings 20 into the normal case windings. In this manner, the structural strength of the aft dome portion 14 of the case 10 is greatly improved which would otherwise be greatly weakened if the several filament were not reinforced.

Figure 4:
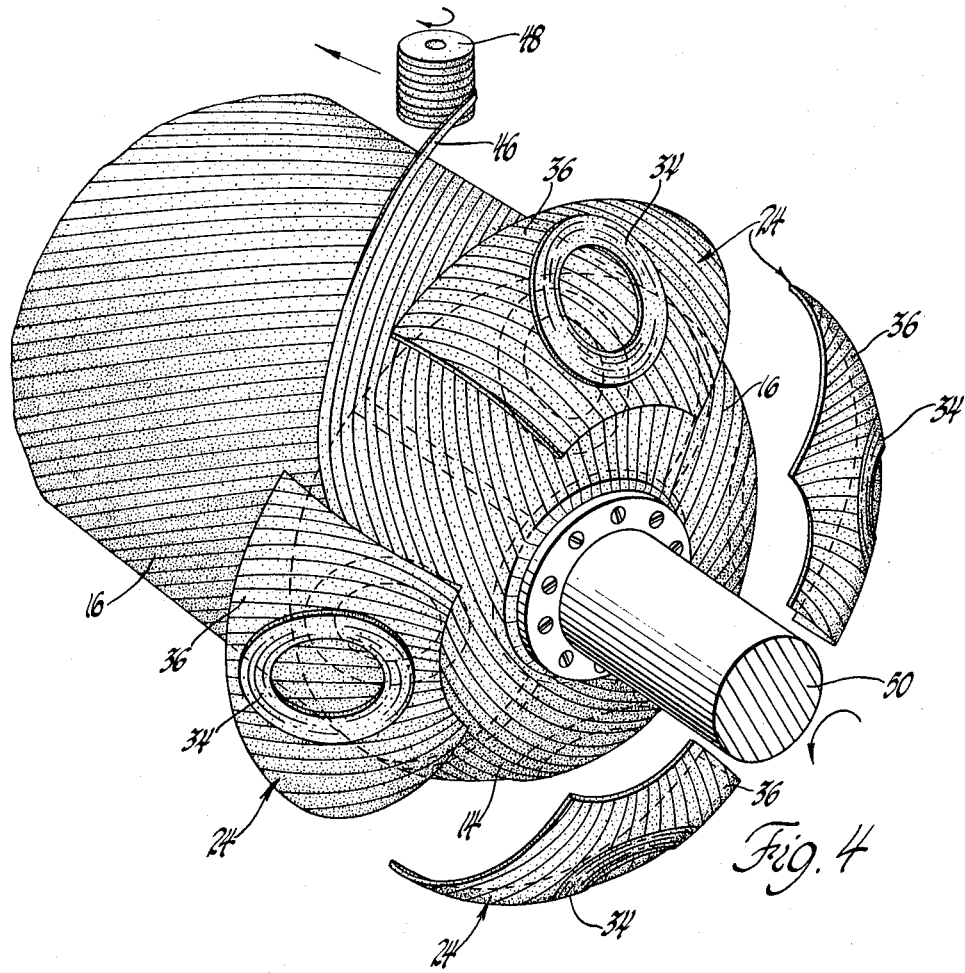
FIGURE 4 is a perspective view illustrating the procedure for incorporating reinforcement subassemblies embodying the present invention into a laminated filament wound container, such as the rocket fuel case shown in FIGURE 1.

The central opening 22 is formed in the case due to the necessity of connecting the winding mandrel to a shaft driving means during the winding operation, as shown in FIGURE 4 of the drawings, and also, to provide a means for removing the mandrel after the winding operation is completed. Also, the opening 22 permits the positioning of insulation and other appropriate fittings within the case. The central opening 22 could also be used for a nozzle port, although it is closed by suitable metal cap arrangement 26 in the rocket case 10 shown in FIGURE 1 of the drawings. The rocket case 10 also includes a laminated filament wound generally conical skirt atachment 28 which preferably is preformed and integrally incorporated in and bonded to the case structure at the aft end of the case during the winding process, as will hereinafter be more fully explained. The aft end 29 of the skirt attachment 28 is generally cylindrical and is provided with a plurality of circumferentially spaced openings 30 for affixing the case 10 within a rocket shell. Also, the forward end of the case 10 may be provided with a similarly attached skirt arrangement 32.

Figure 5:
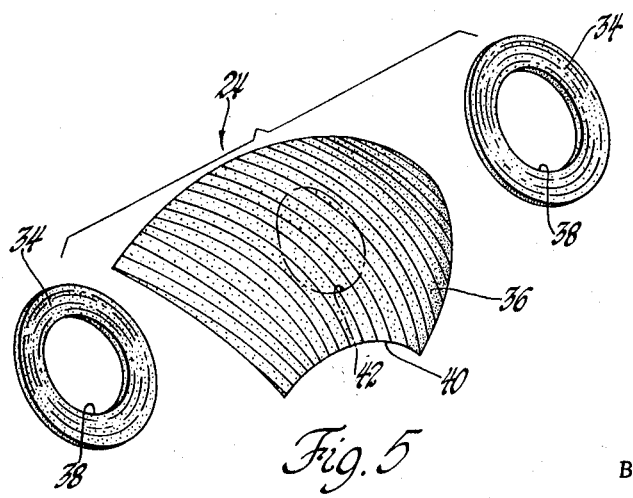
FIGURE 5 is a perspective view of the various parts of a reinforcement subassembly embodying the present invention.

FIGURE 5 of the drawings illustrates the individual parts of the reinforcement subassembly 24 embodying the present invention which may be used to reinforce the aft dome portion 14 of the case 10 shown in FIGURE 1 of the drawings. As shown in FIGURE 5, the subject reinforcement subassembly consists of two generally annular primary reinforcement wafers or rings 34 and a secondary reinforcement doily 36 which is generally shaped in the form of a quadrant of a dome having approximately the same contour as the dome-shaped end portion 14 of the case 10.

The primary reinforcement rings 34 preferably are wound in a circular winding pattern over an appropriately shaped mandrel to provide openings 38 in the rings having a generally egg-shaped or eccentric oval-like configuration. In this manner, when the reinforcement subassembly is assembled and installed as a unit on the aft dome portion of the case, as shown in FIGURE 4 of the drawings, the openings in the rings will appear to be circular in shape when viewed from the aft end of the case on a line parallel to the nozzle port centerline. Hence, no severing of the filament windings of the primary reinforcements is necessitated, since the rings conform generally in size and shape to the nozzle port openings 20. Also, the rings 34 preferably are formed using the same plastic impregnated filament which is used for the normal case windings so that the reinforcement subassembly may be integrally incorporated in and bonded to the filament wound case structure when the entire assembled case is finally cured, as will hereinafter be more fully explained. Thus, the rings may be formed by winding as epoxy resin impregnated fiberglass filament over an appropriately shaped mandrel.

However, it should be appreciated that the primary reinforcements may be formed of other materials, such as nylon or rayon yarn, and that other shapes than rings may be utilized as the primary reinforcements for different types of containers having a different shape or contour than the elongated cylindrical case shown in the drawings. Furthermore, the primary reinforcements, such as the rings 34 in the preferred embodiment of the present invention, may be made to any suitable width and thickness, depending on the size of the area being reinforced and the structural and design properties desired. However, in the preferred embodiment of the invention, the rings 34 preferably are relatively thin in thickness.

Similarly, the secondary reinforcements or doilies 36 of the reinforcement subassembly 24 may be formed to the desired size and shape from any suitable material, such as an epoxy resin impregnated fiberglass filament, rayon yarn or nylon yarn, by a suitable winding technique using an appropriately shaped mandrel to provide the desired contour to the doily. However, the secondary reinforcements are also preferably formed of the same materials as are used in the primary reinforcements and the case so that an integral structure may be formed on completion of the case assembly, as will hereinafter be more fully explained. In the embodiment of the present invention shown in the drawings, the secondary reinforcements or doilies are formed in the general shape of quadrants of a dome having the general contour of the aft dome portion of the case and consists of a plurality of helically wound layers of epoxy impregnated fiberglass filament. This may be conveniently accomplished by helically winding the plastic impregnated filament over a double dome or spherical mandrel and subsequently cutting the wound structure into the shape of the doilies. The radially inner portion of the doily may be provided with a circular cutout 40 to accommodate the cap arrangement 26 which is positioned over the central opening 22 in the aft dome portion 14 of the case 10, as shown in FIGURE 1 of the drawings.

It should be appreciated that size and shape of the secondary reinforcement may vary considerably, depending on the shape of the container which is to be reinforced in accordance with the present invention. In the embodiment shown in the drawings, the secondary reinforcements are preferably made somewhat greater in size than a quadrant of the dome to permit a certain amount of overlap in the meridinal joints on the aft dome portion of the case, as shown in FIGURE 1 of the drawings, thereby providing for a better distribution of operational stresses between adjacent reinforcement subassemblies over the entire end portion 14 of the case 10 during rocket operation.

After the primary and secondary reinforcements are wound, the plastic bonding medium impregnating the filaments of the reinforcement are partially cured to impart a self-sustaining degree of strength to these parts. A reinforcement subassembly is then assembled from these parts while they are in a partially cured state by properly aligning a ring 34 on each side of the doily 36 so that the openings 38 in the rings have the same orientation with respect to the doily. The rings may be affixed to the doily by any suitable means to form an integral reinforcement subassembly, such as by coating the mating surfaces with the epoxy bonding medium and curing it until the parts are bound together. Preferably, the opening for the nozzle port in the doily, as indicated by the dotted line 42, shown in FIGURE 5, is not formed until after the entire case is assembled.

FIGURE 4 of the drawings illustrates the preferred method of case assembly. The epoxy impregnated fiberglass filament 46 is fed from a traveling spool of filament 48 to the mandrel (not shown in the drawings). The mandrel is rotated in a timed relationship with the movement of the spool 48 by means of a drive shaft 50 which is suitably connected to the center portion of the mandrel so that the filament is wound in a double loop helical pattern over the mandrel. As illustrated in FIGURE 4 of the drawings, the four subassembly reinforcements 24 are then properly aligned and positioned on the aft portion of the case by any suitable means between successive layers of helical filament windings or wrappings 16. It should be appreciated that although the reinforcement subassemblies are preferably incorporated in the structure as a unit, each part of the subassembly could be individually affixed to the case. The subassembly reinforcements 24 may be affixed to the case windings 16 by any suitable means, such as coating the case and/or subassembly with a plastic bonding medium, such as an epoxy resin, so that the subassembly parts will stick to the case windings. Also, in winding the case, the fiberglass filament is preferably preimpregnated with a suitable liquefied thermosetting plastic resin system, such as an epoxy resin system, just prior to being wound over the mandrel. Thus the windings or wrappings are preferably applied in a wet state. However, each layer of windings could subsequently be impregnated, in situ, on the mandrel using any suitable technique, such as spraying or applying a brush coating of the plastic bonding resin or the filament could be wound in a partially cured state.

After the desired number of windings and reinforcements have been assembled over the mandrel and impregnated with the plastic resin, the case so formed is subjected to a conventional curing treatment, such as those disclosed in the aforementioned United States Patent No. 3,052,650 Wear et al. to form an integral, strong, fluid-tight structure. Then openings may be cut through the helical windings 16 and through the dome-shaped secondary reinforcements or doilies 36 by any suitable technique to provide the nozzle port openings 20 extending through the dome-shaped end portion 14 of the case 10, as shown in FIGURE 2 of the drawings.

Referring to FIGURE 2 of the drawings, a partial cross-sectional view of the completely assembled reinforced rocket case 10 is illustrated to show the reinforced winding structure of the case around the nozzle port 19 where the filament strands have been severed to provide the nozzle port opening 20. The cylindrical nozzle port tube 19 extends through the opening 20 into case chamber 51 and is affixed to a generally annular member 52 by means of screws 54. The annular member 52 has the general contour of the internal portion of the case and is bonded to the inner layer of case windings 55 and secured to the nozzle port tube 19 by means of suitable fasteners, such as screws 54. Another generally annular member 56 having the contour of the outer dome-shaped end portion of the case is similarly snugly positioned against the outer case windings 58 and secured to the nozzle port by means of pins 60, as shown in FIGURE 2. In this manner, the case winding structure including the reinforcement subassemblies 24 may be snugly secured against the nozzle port 19.

Thus, as shown in FIGURE 2 of the drawings, the reinforcement subassemblies 24 are integrally incorporated in the case 10, since they are integrally bonded to the normal helical case windings 16. In accordance with the present invention, a reinforcement subassembly is positioned between successive layers of laminations of filament windings which have been severed to provide openings in the case. Hence, the number of reinforcement subassemblies employed is dependent upon the number of layers or laminations of helical case windings or wrappings used to form the case.

Also, as shown in FIGURE 2 of the drawings, the preformed annular conical skirt 28 is integrally incorporated and bonded to the case adjacent the aft dome portion 14. The skirt 28 is also preferably formed using the same filament and thermosetting plastic resin employed in forming the case. The skirt 28 may be incorporated in the case structure by suitably positioning it over the aft dome portion of the case after a few layers of helical windings have been wound over the mandrel used in forming the case. Then subsequent windings, such as hoop windings 18, may be wound over the axially inner portion 62 of the skirt to secure it to the case. The skirt may be coated with plastic resin to bond it to the case and form an integral structure. Furthermore, as shown in FIGURE 3 of the drawings, the wafers or rings 34 and doilies 36 which form the reinforcement subassemblies 24 preferably are progressively smaller in width adjacent the outer case windings 58 than near the inner case windings. This is desirable to facilitate the winding of the case and to decrease the bulkiness of the case in the reinforced area.

Hence, in accordance with the present invention, the relatively small rings 34 are integrally bonded to the layers of helical case windings or wrappings 16 adjacent the area where the windings have been severed to provide an opening. In this manner, the rings function as a primary reinforcement, since each of the severed windings is integrally joined and bonded to the same member through which the stresses are distributed to the other case windings which are bonded to the rings in this area of the case. Furthermore, since the relatively large secondary reinforcement doilies 36 are also integrally bonded to the normal helical case windings, the stresses developed in the case are further transmitted and distributed through the doilies to a larger portion of the case windings. In fact, in the embodiment of the present invention shown in the drawings, the subject reinforcement subassembly is designed to transmit in shear approximately three times the normal load stresses which are developed in the nozzle port areas during rocket operation. It should be appreciated, of course, that the subject reinforcement method of the present invention may be employed in other types of high pressure cases or containers besides rocket cases.

Thus, while the present invention has been described in terms of certain preferred embodiments, it should be expressly understood that it is not to be limited thereby, except as defined by the appended claims.

I claim:

1. A container comprising a generally cylindrical body portion and dome-shaped end portions, said container being formed by a plurality of layers of plastic impregnated, helically wound, filament wrappings and having at least one opening extending through at least one of said dome-shaped end portions of said container, and at least one preformed, plastic impregnated, filament wound reinforcement subassembly having the general contour of at least a portion of said dome-shaped end portions of said container, said subassembly including a secondary reinforcement member and two generally annular primary reinforcement members, said secondary reinforcement member having an opening extending therethrough conforming generally to the shape and size of said opening in said dome-shaped end portion of said container and the openings defined by said generally annular members, said secondary reinforcement member being positioned between and integrally bonded to said generally annular members so that said openings defined by said generally annular members are coaxially aligned with said opening in said secondary reinforcement member, said reinforcement subassembly being alternately positioned between successive layers of said wrappings so that said opening in said reinforcement subassembly and said opening in said dome-shaped end portion of said container are coaxially aligned, said subassembly being integrally bonded to said successive layers of said wrappings to provide an integrally reinforced laminated container structure.

2. A container comprising an elongated cylindrical body portion and generally dome-shaped end portions, said container being formed by a plurality of layers of epoxy resin impregnated, helically wound, fiberglass filament wrappings and having a plurality of openings extending through at least one of said dome-shaped end portions of said container, and a plurality of preformed, epoxy resin impregnated, fiberglass filament wound reinforcement subassemblies having the general contour of at least a portion of said dome-shaped end portions of said container in the area adjacent each of said openings in said container, each of said subassemblies including a relatively large secondary reinforcement doily member and two relatively small generally annular primary reinforcement ring members, said doily member having an opening extending therethrough conforming generally to the size and shape of said openings in said dome-shaped end portions of said container and the openings in said ring members, each of said doily members being positioned between and integrally bonded to two of said ring members so that said openings in said ring members are coaxially aligned with said openings in said doily member, said reinforcement subassemblies being alternately positioned between successive layers of said wrappings around each of said openings in said dome-shaped end portions of said container so that said openings in said reinforcement subassemblies and said openings in said dome-shaped end portion of said container are coaxially aligned, said reinforcement subassemblies being integrally bonded to said successive layers of said wrappings to provide an integrally reinforced laminated container structure.

3. A rocket case for containing rocket fuel comprising an elongated cylindrical body portion having generally dome-shaped end portions, said case being formed by a plurality of layers of plastic impregnated filament wrappings and having at least one nozzle port opening extending through one of said dome-shaped end portions of said case, a generally cylindrical metal nozzle port positioned in each of said nozzle port openings and snugly secured therein by suitable means affixed to the internal and external wrappings of said case adjacent said nozzle port opening, and at least one preformed plastic impregnated filament wound reinforcement subassembly to reinforce the area of said case adjacent said nozzle port openings, said subassembly having the appropriate general contour of at least a portion of said dome-shaped end portion of said case adjacent the corresponding nozzle port opening to be reinforced, said subassembly including a secondary reinforcement member and two generally annular primary reinforcement members, said secondary reinforcement member having an opening extending therethrough conforming generally to the size and shape of said corresponding nozzle port opening and the openings defined by said corresponding generally annular members of said subassembly, said secondary reinforcement members being positioned between said generally annular members and integrally bonded thereto so that said openings defined by said generally annular members are coaxially aligned with said opening in said secondary reinforcement member, said reinforcement subassembly being alternately positioned between successive layers of said wrappings to surround said corresponding nozzle port opening so that the opening in said reinforcement subassemblies and said corresponding nozzle port opening is coaxially aligned, said subassembly being integrally bonded to said successive layers of said wrappings to provide an integrally reinforced laminated rocket case, said primary reinforcement generally annular members being capable of transmitting and distributing the operational stresses to said filament wrappings surrounding said nozzle port opening and said secondary reinforcement member of said subassembly being adapted to transmit and distribute operational stresses over a larger portion of said case wrappings which are bonded to said secondary reinforcement member.

4. A rocket case for containing solid-propellent rocket fuel, said case comprising an elongated cylindrical body portion having at least one generally dome-shaped end portion, said case being formed by a plurality of layers of epoxy resin impregnated helically wound fiberglass filament wrappings, said cylindrical body portion also including a plurality of circumferential hoop wrappings, said dome-shaped end portion of said case having four nozzle port openings extending therethrough which are equally circumferentially separated and radially spaced from a centrally located opening in said dome portion, said centrally located opening being closed by a metal cap arrangement secured thereover, said nozzle port openings being formed by severing a plurality of strands of said filament wrappings in each of said layers, a generally cylindrical metal nozzle port tube snugly positioned within each of said nozzle port openings and secured therein by any suitable means affixed to the internal and external wrappings of said case adjacent each of said nozzle port openings, and a plurality of preformed epoxy resin impregnated fiberglass filament wound reinforcement subassemblies having the general contour of at least a portion of said dome-shaped end portion of said case, each of said subassemblies including a secondary reinforcement doily which is slightly greater in arcuate cross section than a quadrant of said dome-shaped end portion of said case, and two smaller generally annular primary reinforcement rings, said secondary reinforcement being formed by a helical winding technique and having an opening provided therein conforming generally to the size and shape of said nozzle port openings and the openings in said rings, each of said doilies being positioned between and integrally bonded to two of said rings so that said openings in said rings are coaxially aligned with said openings in said doilies, said reinforcement subassemblies being positioned between successive layers of said wrappings surrounding said nozzle port openings so that said openings to be reinforced are coaxially aligned, a portion of each of said doilies of said subassemblies overlapping the doily portion of an adjacent subassembly surrounding an adjacent nozzle port opening, said subassemblies being integrally bonded to said successive layers of said wrappings to provide an integrally reinforced laminated rocket case, and a preformed, filament wound, generally conical skirt portion having the general size of the cylindrical body portion of said case coaxially aligned with and integrally bonded to said cylindrical body portion of said case at an area adjacent said dome-shaped end portion of said case, said skirt having a plurality of openings therein for securing said case within a rocket casing.

5. A reinforcement assembly for reinforcing the dome-shaped end portion of a case which is formed of a plurality of layers of epoxy resin impregnated, helically wound, fiberglass filament wrappings and has at least one opening extending therethrough, said assembly having the general contour of said end portion of said case and comprising two generally annular, circularly wound, epoxy resin impregnated, fiberglass filament ring members having generally egg-shaped openings defined thereby which conform generally in size and shape to said opening in said case, and a helically wound doily member positioned between said ring members and integrally bonded thereto, said doily being provided with an opening conforming generally in shape and size to said openings defined by said ring members and being coaxially aligned therewith, said assembly being adapted to be positioned alternately between successive layers of said wrappings and integrally bonded thereto in a manner such that the opening in said reinforcement assembly are coaxially aligned with said opening in said wrappings, thereby reinforcing said case in the area surrounding said opening in said case.

6. A container comprising a generally cylindrical body portion and dome-shaped end portions, said container being formed by a plurality of layers of plastic impregnated, helically wound, filament wrappings and having at least one opening extending through at least one of said dome-shaped end portions of said container, and at least one preformed plastic impregnated filament wound reinforcement subassembly having the general contour of at least a portion of said dome-shaped end portions of said container, said subassembly including a secondary reinforcement member and at least one generally annular primary reinforcement member, said secondary reinforcement member having an opening extending therethrough conforming generally to the shape and size of said opening in said dome-shaped end portion of said container and the opening defined by said generally annular member, said secondary reinforcement member being positioned adjacent and integrally bonded to said generally annular member so that said opening defined by said generally annular member is coaxially aligned with said opening in said secondary reinforcement member, said reinforcement subassembly being alternately positioned between successive layers of said wrappings so that said opening in said reinforcement subassembly and said opening in said dome-shaped end portion of said container are coaxially aligned, said subassembly being integrally bonded to said successive layers of said wrappings to provide an integrally reinforced laminated container structure.

References Cited by the Examiner
UNITED STATES PATENTS

| | | |
|---|---|---|
| 2,744,043 | 5/1956 | Ramberg. |
| 2,809,762 | 10/1957 | Cardona _____ 220—3 |
| 2,995,011 | 8/1961 | Kimmel _____ 60—35.6 |
| 3,074,585 | 1/1963 | Koontz _____ 60—35.6 |
| 3,083,864 | 4/1963 | Young. |
| 3,172,252 | 3/1965 | Boek _____ 60—35.6 |

MARK NEWMAN, *Primary Examiner.*

CARLTON R. CROYLE, *Examiner.*